United States Patent
Caraccio et al.

(10) Patent No.: US 10,977,198 B2
(45) Date of Patent: Apr. 13, 2021

(54) HYBRID MEMORY SYSTEM INTERFACE

(71) Applicant: Micron Technology, Inc., Boise, ID (US)

(72) Inventors: Danilo Caraccio, Milan (IT); Marco Dallabora, Melegnano (IT); Daniele Balluchi, Cernusco Sul Naviglio (IT); Paolo Amato, Treviglio (IT); Luca Porzio, Casalnuovo di Napoli (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/128,882

(22) Filed: Sep. 12, 2018

(65) Prior Publication Data

US 2020/0081853 A1 Mar. 12, 2020

(51) Int. Cl.
*G06F 13/16* (2006.01)
*G06F 13/28* (2006.01)

(52) U.S. Cl.
CPC .......... *G06F 13/1668* (2013.01); *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 6,128,669 A * | 10/2000 | Moriarty | G06F 13/28 709/250 |
| 6,785,767 B2 | 8/2004 | Coulson | |
| 7,660,306 B1 * | 2/2010 | Eiriksson | H04L 12/4641 370/392 |
| 9,432,298 B1 | 8/2016 | Smith | |
| 9,602,437 B1 * | 3/2017 | Bernath | H04L 49/901 |
| 9,736,276 B2 * | 8/2017 | Wagh | G06F 13/385 |
| 10,031,879 B2 | 7/2018 | Eilert et al. | |
| 10,310,974 B2 * | 6/2019 | Liang | G06F 12/0802 |
| 2004/0010612 A1 * | 1/2004 | Pandya | H04L 67/1097 709/230 |
| 2009/0055157 A1 * | 2/2009 | Soffer | G06F 15/7864 703/27 |

(Continued)

FOREIGN PATENT DOCUMENTS

| KR | 10-2010-0133288 A | 12/2010 |
|---|---|---|
| WO | 2017/189081 A1 | 11/2017 |

OTHER PUBLICATIONS

International Search Report and Written Opinion from related International Application No. PCT/US2019/046454, dated Dec. 2, 2019, 14 pages.

(Continued)

*Primary Examiner* — Henry Tsai
*Assistant Examiner* — Christopher A Bartels
(74) *Attorney, Agent, or Firm* — Brooks, Cameron & Huebsch, PLLC (57) ABSTRACT

The present disclosure includes apparatuses and methods related to a hybrid memory system interface. An example computing system includes a processing resource and a storage system coupled to the processing resource via a hybrid interface. The hybrid interface can provide an input/output (I/O) access path to the storage system that supports both block level storage I/O access requests and sub-block level storage I/O access requests.

21 Claims, 5 Drawing Sheets

(56) References Cited

U.S. PATENT DOCUMENTS

| | | | |
|---|---|---|---|
| 2010/0037024 A1 | 2/2010 | Brewer et al. | |
| 2010/0217924 A1 | 8/2010 | Panabaker et al. | |
| 2011/0119470 A1* | 5/2011 | Ohmacht | G06F 3/0671 712/220 |
| 2011/0119526 A1* | 5/2011 | Blumrich | G06F 15/17381 714/16 |
| 2013/0111182 A1 | 5/2013 | Kslot et al. | |
| 2013/0325998 A1* | 12/2013 | Hormuth | G06F 15/17331 709/212 |
| 2014/0359044 A1* | 12/2014 | Davis | H04L 45/60 709/213 |
| 2015/0046675 A1* | 2/2015 | Barry | G06F 13/28 712/7 |
| 2015/0180782 A1* | 6/2015 | Rimmer | H04L 49/3045 370/236 |
| 2015/0378737 A1* | 12/2015 | Debbage | G06F 5/14 712/225 |
| 2016/0224474 A1* | 8/2016 | Harriman | G06F 12/1036 |
| 2016/0328169 A1* | 11/2016 | Hassan | G06F 3/0625 |
| 2016/0342341 A1* | 11/2016 | Voigt | G06F 13/14 |
| 2016/0378545 A1* | 12/2016 | Ho | G06F 9/50 718/107 |
| 2017/0206166 A1* | 7/2017 | Kumar | G06F 16/172 |
| 2017/0344510 A1* | 11/2017 | Park | G06F 13/4282 |
| 2018/0018101 A1* | 1/2018 | Benisty | G06F 3/0608 |
| 2019/0347125 A1* | 11/2019 | Sankaran | G06F 9/3863 |

OTHER PUBLICATIONS

Office Action from related Taiwanese Patent Application No. 108131228, dated Sep. 7, 2020, 20 pages.

Office Action from related Taiwanese Patent Application No. 108131228, dated Jan. 29, 2021, 18 pages.

* cited by examiner

HYBRID MEMORY SYSTEM INTERFACE

TECHNICAL FIELD

The present disclosure relates generally to semiconductor memory and methods, and more particularly, to apparatuses and methods related to a hybrid memory system interface.

BACKGROUND

Memory systems, such as storage systems, may be implemented in electronic systems, such as computers, cell phones, hand-held electronic devices, etc. Various electronic devices such as solid state drives (SSDs), embedded Multi-Media Controller (eMMC) devices, Universal Flash Storage (UFS) devices, and the like, may include non-volatile storage components for storing data that can be accessed by a number of processing resources (e.g., a host processor, a processor of a peripheral device, etc.). Non-volatile storage components provide persistent data by retaining stored data when not powered and may include NAND flash memory, NOR flash memory, read only memory (ROM), Electrically Erasable Programmable ROM (EEPROM), Erasable Programmable ROM (EPROM), and resistance variable memory, such as phase change random access memory (PCRAM), resistive random access memory (RRAM), ferroelectric random access memory (FeRAM), magnetoresistive random access memory (MRAM), and programmable conductive memory, among other types of memory. Memory systems can also include volatile storage components that require power to maintain data. Volatile memory components are often used for main system memory and/or for temporary storage. Examples of volatile memory include dynamic random access memory (DRAM), static random access memory (SRAM), synchronous dynamic random access memory (SDRAM), and thyristor random access memory (TRAM), among others.

DETAILED DESCRIPTION

The present disclosure includes apparatuses and methods related to a hybrid memory system interface. An example computing system includes a processing resource and a storage system coupled to the processing resource via a hybrid interface. The hybrid interface can provide an input/output (I/O) access path to the storage system that supports both block level storage I/O access requests and sub-block level storage I/O access requests.

Computing systems such as personal computers, laptops, tablets, phablets, smartphones, Internet-of-Things (IoT) enabled devices, etc., may include one more memory resources to store data and/or instructions associated with the computing system. As used herein, "IoT enabled devices" include physical devices, vehicles, home appliances, and other devices embedded with electronics, software, sensors, actuators, and/or network connectivity which enables such objects to connect and exchange data. Examples of IoT enabled devices include wearable technologies, smart home devices, intelligent shopping systems, and monitoring devices, among other cyber-physical systems. In addition, computing systems may include one or more processing resources to execute system software such an operating system to provide common services for applications running on the computing system. Examples of operating systems include Android®, Linux®, Unix®, Windows®, etc.

During operation, a processor such as a central processing unit (CPU) of the computing system may execute instructions such as firmware, computer code, meta-code, database files, etc. to provide functionality to the computing system. To execute the instructions, a number of data requests associated with the instructions, and data and/or the instructions associated with the number of data requests may be accessed, from a storage system, by performing a number of respective access operations. In some approaches, an I/O bus between the CPU and the storage system may be of a particular size only, and a memory local (e.g., such as a cache internal and/or external to a main memory of the computing system) to the CPU may act as an intermediary device, in which a size of the number of data requests may be modified to meet a size requirement of the I/O bus. For example, the number of data requests having a smaller size than the particular size may be aggregated at the main memory. Then, an I/O access request (e.g., request having a size equal to the particular size) may be generated based on the aggregated data request and transferred, via the I/O bus of the particular size, to the storage system. Accordingly, a lack of flexibility of supporting various sizes of requests, or data and/or instructions associated with the requests may consume resources of the computing system.

In contrast, a number of embodiments of the present disclosure herein may reduce, by utilizing a hybrid memory system interface, an amount of resources consumed in association with executing instructions. For example, data and/or instructions associated with requests such as sub-block level storage I/O requests may be directly accessed, by a processing resource (e.g., CPU), from a storage system storing the data and/or the instructions. Accordingly, in some embodiments, a main memory in accordance with a number of embodiments may not necessarily be utilized as the intermediary device, which can reduce latencies associated with transferring data and/or instructions through the main memory.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, designators such as "N," etc., particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
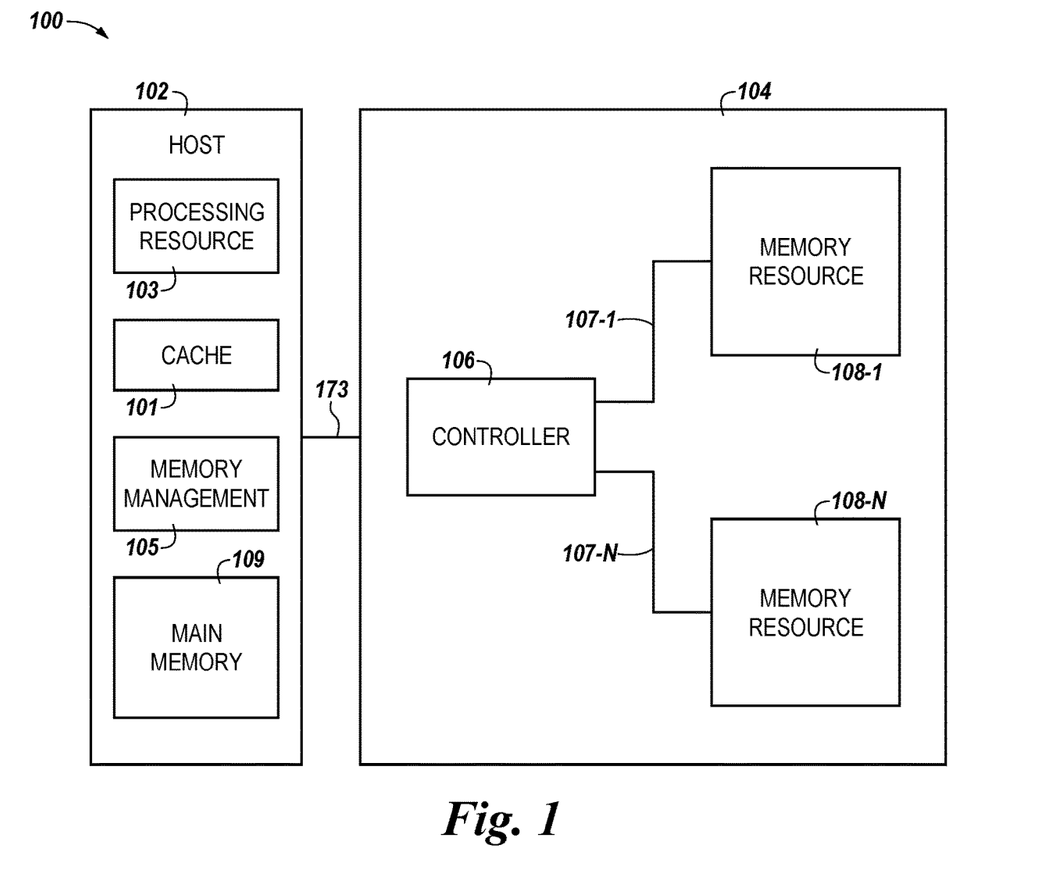
FIG. 1 is a block diagram of an apparatus in the form of a computing system including a host including a main memory and memory system in accordance with a number of embodiments of the present disclosure.

FIG. 1 is a block diagram of an apparatus in the form of a computing system 100 including a host 102 including a main memory 109 and a storage system 104 in accordance with a number of embodiments of the present disclosure. As used herein, host 102 and/or storage system 104 might also be separately considered as an "apparatus."

The computing system 100 (e.g., mobile system) can be a computing device such as a mobile device. As used herein, a "mobile device" refers to a device that is portable, utilizes a portable power supply, and sufficiently small to hold and operate in hand. However, embodiments are not so limited. As an example, the host 102 can include a personal laptop computer, a desktop computer, a digital camera, a smart phone, a memory card reader, IoT enabled device, among various other types of hosts.

The system 100 includes a host 102 coupled (e.g., connected), via an I/O access path, to storage system 104, which includes one or more memory resources, as illustrated herein. The system 100 can include separate integrated circuits or both the host 102 and the storage system 104 can be on the same integrated circuit. The system 100 can be, for instance, a server system and/or a high performance computing (HPC) system and/or a portion thereof.

Host 102 can include a system motherboard and/or backplane and can include a number of processing resources (e.g., one or more processors, microprocessors, or some other type of controlling circuitry) such as a processing resource 103. The processing resource 103 may access data and/or instructions stored in memory resources 108-1, . . . , 108-N responsive to receipt of data requests, which may be generated in association with executing the instructions. For example, responsive to receipt of a request to initiate an application, the processing resource 103 may access the memory resources 108-1, . . . , 108-N for retrieving instructions associated with launching the application. For example, the processing resource 103 may access the memory resources 108-1, . . . , 108-N for retrieving data associated with executing instructions. As described further herein, a hybrid interface (not shown) providing an I/O access path 173 may accommodate various types of storage I/O access requests based on a size of the data requests.

The host 102 includes a cache 101 (e.g., CPU cache) that can include a hardware and/or software device that stores data local to the processing resource 103. Data and/or a set of instructions (e.g., a set of instructions executable by the processing resource 103) that are retrieved from the storage system 104 can be copied to the cache 101 such that the processing resource 103 can access the data and/or the set of instructions from the cache 101.

The host 102 includes a memory management unit 105. The memory management unit 105 may be a hardware component that performs translation between virtual memory addresses and physical memory addresses. The memory management unit 105 can further define a platform memory management model to which a size of data requests may be required to match. In a number of embodiments, the memory management unit 105 can flexibly define the platform memory management model such that both block sized and sub-block sized data requests may be serviced without being converted to one another (e.g., without the sub-block sized data requests having been aggregated to a block sized data request).

The host 102 includes a main memory 109. In a number of embodiments, the main memory 109 may be volatile memory such as RAM, DRAM, SRAM, etc. that may be used to store one or more pages of data associated with operation of the computing system 100. Embodiments are not limited to volatile memory; however, and the main memory may include non-volatile memory in addition to volatile memory or in lieu thereof.

As illustrated in FIG. 1, the storage system 104 can include a controller 106 and memory resources 108-1, . . . , 108-N. As used herein, a host 102, storage system 104, controller 106, and/or memory resources 108-1, . . . , 108-N might also be separately considered an "apparatus."

The controller 106 can be a state machine, sequencer, or some other type of controller, and include hardware and/or firmware (e.g., microcode instructions) in the form of an application specific integrated circuit (ASIC), field programmable gate array, etc. The controller 106 can control, for example, access patterns of instructions executed to facilitate operation of the computing system 100.

As shown in FIG. 1, the controller 106 is communicatively coupled to the memory resources 108-1, . . . , 108-N via respective communication channels 107-1, . . . , 107-N. The communication channels 107-1, . . . , 107-N may allow for requests, data, and/or instructions to be transferred between the controller 106 and the memory resources 108-1, . . . , 108-N.

As illustrated in FIG. 1, the storage system 104 may include one or more memory resources 108-1, . . . , 108-N coupled to a controller 106. In some embodiments, the storage system 104 may be a hybrid storage system and the memory resources 108-1, . . . , 108-N may be different kinds of memory resources. For example, memory resource 108-1 may be an emerging non-volatile memory resource such as a 3D Xpoint memory resource, Ferroelectric RAM (Fe-RAM), etc. while the memory resource 108-N may be a NAND memory resource. Embodiments are not limited to these specific examples, and the memory resources 108-1, . . . , 108-N can be same kinds of memory resources such as emerging non-volatile memory resources.

The different kinds of memory resources 108-1, . . . , 108-N can support (e.g., be utilized to perform) storage I/O access requests exhibiting various characteristics. For example, the various characteristics may include the frequency of execution of a particular storage I/O request, the size of the request, the amount of resources (e.g., memory resources and/or processing resources) execution of the request consumes, the speed at which the request may be executed, or other suitable characteristics. Additionally, the different kinds of memory resources 108-1, . . . , 108-N can support storage I/O access requests having different sizes, as described herein. For example, some memory resources such as NAND flash resources may support only block level storage I/O requests, while other memory resources may support sub-block level storage I/O requests.

The host 102 can be communicatively coupled to the storage system 104 via a hybrid interface (not shown) that provides an I/O access path 173 to the storage system 104. The I/O access path 173 can support both block level storage I/O access requests and sub-block level storage I/O requests. In various embodiments, block level storage I/O requests can refer to storage I/O requests having a size greater than a host cache line size (e.g., 4 kilobyte), while sub-block level storage I/O requests can refer to storage I/O requests having a size not greater than the host cache line size (e.g., 32, 64, and/or 128 bytes).

Since the I/O access path 173 can support both block level and sub-block level I/O access requests, the hybrid interface may generate various types of storage I/O access requests based on a size of data requests (e.g., generated in association with executing an application). For example, the hybrid interface may generate a block level storage I/O access request when a received data request is a block sized data request. For example, the hybrid interface may generate a sub-block level storage I/O access request when a received data request is a sub-block sized data request. Accordingly, a plurality of sub-block sized data requests can be serviced, via a plurality of separate sub-block level storage I/O access requests, without having been aggregated for transfer to/from the storage system 104. Stated alternatively, the hybrid interface may be configured to prevent a plurality of sub-block sized data requests from being aggregated to a block sized data request for transfer to/from the storage system 104.

That the plurality of sub-block sized data requests can be serviced without having been aggregated for the transfer enables a direct access, by the processing resource 103, to the memory resources 108-1, . . . , 108-N for the sub-block sized data requests. For example, if a data request is a sub-block sized data request, the hybrid interface can provide, to the processing resource 103, a direct access to a particular one of the memory resource 108-1, . . . , 108-N (e.g., storing data and/or a set of instructions associated with the data request) having a sub-block level accessibility. As used herein, a memory resource supporting a block level storage I/O access request can be referred to as a memory resource having a block level accessibility, and a memory resource supporting a sub-block level storage I/O access request can be referred to as a memory resource having a sub-block level accessibility. For example, a first type of the memory resources 108-1, . . . , 108-N such as an emerging non-volatile memory resource can support a sub-block level access request, while a second type of the memory resource 108-1, . . . , 108-N such as a NAND can support a block level access request but may not support sub-block level access requests. Although embodiments are not so limited, only one of the first type and the second type of non-volatile memory resource may support sub-block level storage I/O access requests. A portion of the memory resources 108-1, . . . , 108-N having a sub-block level accessibility may have a lower access time and/or a higher endurance than other portions memory resources 108-1, . . . , 108-N having a block level accessibility.

Enabling a direct access to memory resources 108 of storage system 104, without use of main memory (e.g., 109) as an intermediary, can be utilized in various manners.

Often, in communicating requests, data, and/or instructions between the host 102 and the storage system 104, the main memory 109 may act as an intermediary device through which requests, data, and/or instructions are transferred. As an example, performing a read operation of data and/or instructions stored in the storage system 104 may involve copying the data and/or the set of instructions to the main memory 109 such that the processing resource 103 can access the data and/or the set of instructions from the main memory 109.

However, the hybrid interface in accordance with a number of embodiments can provide direct access to a storage system 104. As an example, the hybrid interface can eliminate (e.g., by providing the I/O access path supporting the sub-block level I/O access requests as well) a need for the aggregation of the plurality of sub-block sized data requests to a block sized request; therefore, storage I/O access requests, data and/or a set of instructions may also be communicated, without transferring through the main memory 109, directly between the processing resource 103 and memory resources 108-1, . . . , 108-N. As such, resources of the main memory 109 may be preserved for other operations. In a number of embodiments, the size of direct access requests may be limited to requests less than or equal to the CPU cache line size, for example; however, embodiments are not so limited. Further details of how enabling the direct access associated with a sub-block sized data request can be utilized are described in connection with FIGS. 3, 4, and 5.

Figure 2:
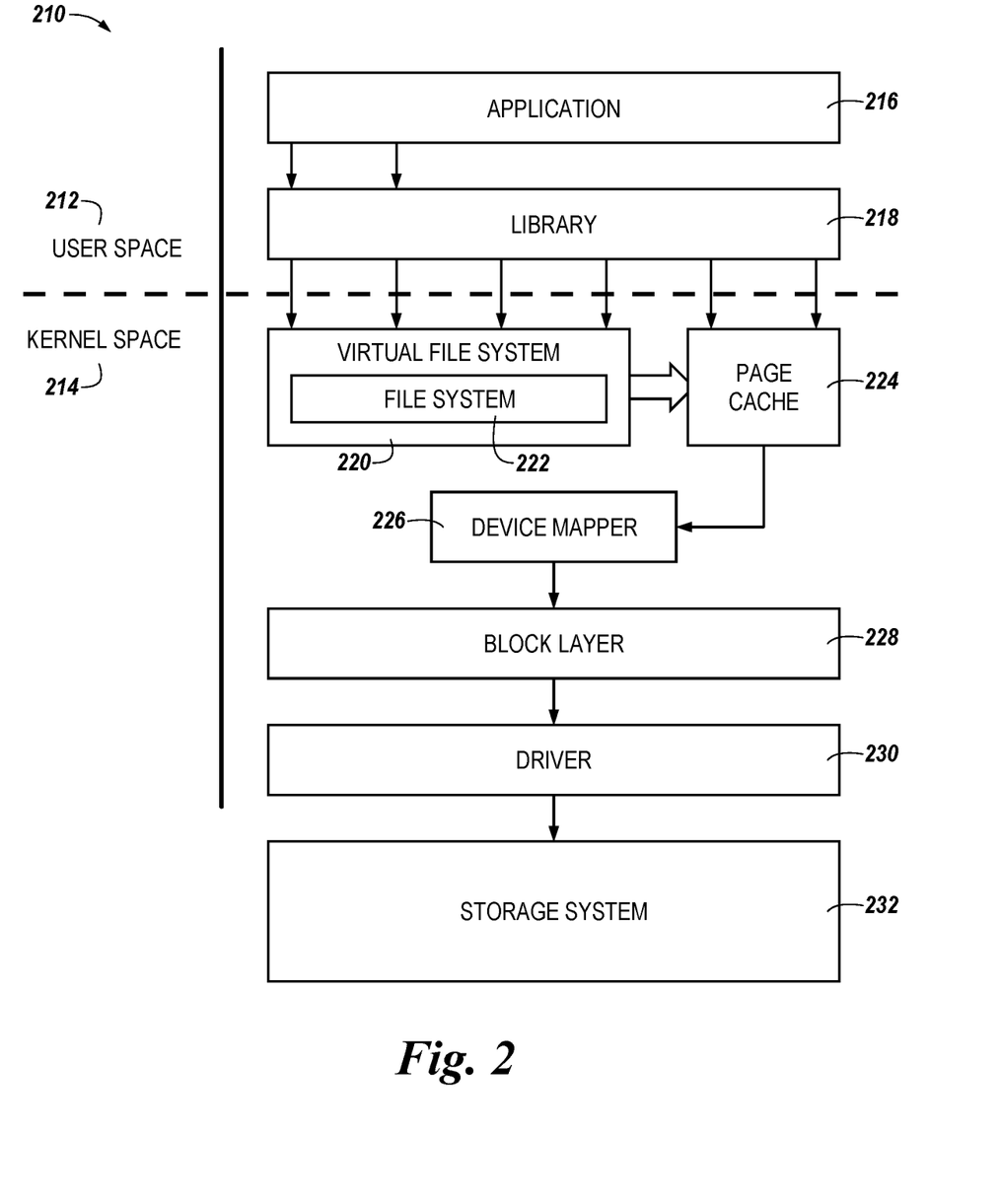
FIG. 2 is a block diagram of an apparatus in accordance with some approaches.

FIG. 2 is a system/application level block diagram representing a portion of a computing system 210 in accordance with some approaches. The portion of the computing system 210 may include a software stack, such as a user space 212 and a system space 214 (e.g., kernel space), responsible for operation of a computing system, and a hardware portion including a storage system 232.

The user space 212 and the system space 214 may be a portion of an operating system. For example, the operating system of the user space 212 and the system space 214 may represent an operating system of a Android® user and a Linux® kernel associated therewith, respectively. In such embodiments, a portion of the computing system 210 may be considered a "software storage stack" (e.g., a portion of the computing system 210 may represent a software-based kernel implementation of an operating system).

Commands (e.g., requests) to perform operations (e.g., reads and/or writes) to access data/instructions (e.g., organized as files) in the storage system 232 may be issued to the library component 218 as a part of executing the instructions associated with the applications 216 of the user space 212. Commands issuable from the user space 212 (e.g., applications 216 of the user space 212) may include fread ( ) and/or fwrite ( ) to perform a read operation and a write operation, respectively, on the storage system 232, for example.

The library component 218 of the user space 212 may store a number of instructions that can be utilized by the user space 212 for routing the commands to the kernel space 214. For example, the user space 212 may look for instructions (e.g., C-based instructions) corresponding to the commands associated with executing the application 216, and may route the instructions retrieved from the library component 218 to the kernel space (e.g., page cache 224). The retrieved instructions may translate an original byte-level (e.g., sub-block level) command to a block level (e.g., block level) command such as the 4 kB command. The library component 218 may be a library of standard functions that include instructions in various languages including at least C-based language.

Along with the write and/or read commands, the library component may also issue other commands to, for example, the page cache 224. The other commands may include mapping command (e.g., mmap), which maps file to a particular memory location, and allocating command (e.g., malloc), which allocates a file to a memory location and/or returns a pointer to a memory location where the file is allocated.

The virtual file system component 220 may include instructions executable by a processing resource (e.g., a processing resource associated with a host) and/or may be provisioned with hardware resources on which the instructions may ultimately be executed to provide an abstraction layer on top of the file system component 222. For example, the virtual file system component 220 may include instructions that may be executed to access local and/or network storage devices. In some embodiments, the virtual file system 220 may include instructions that may be executed to access local and/or network storage devices transparently (e.g., without a client application interaction). The instructions associated with the virtual file system component 220 may specify an interface between the kernel space and the file system component 222.

The file system component 222 may include instructions executable by a processing resource (e.g., a processing resource associated with a host) and/or may be provisioned with hardware resources on which the instructions may ultimately be executed to control how data associated with the computing system 210 is stored and/or retrieved. For example, the file system component 222 may include instructions executable to store and/or retrieve data from the storage system 104.

The device mapper component 226 may include instructions executable by a processing resource (e.g., a processing resource associated with a host) and/or may be provisioned with hardware resources on which the instructions may ultimately be executed to map physical block devices onto higher-level virtual block devices. The device mapper component 226 forms the foundation of the logical volume manage (LVM), software redundant array of independent disks (RAIDs) and/or dm-crypt disk encryption (e.g., transparent disk encryption subsystem in the kernel space 214), and offers additional features such as file system snapshots.

The page cache component 224 may include instructions executable by a processing resource (e.g., a processing resource associated with a host) and/or may be provisioned with hardware resources on which the instructions may ultimately be executed to buffer commands routed from the virtual file system component 220. The page cache component 224 may be referred to as a "disk cache" and can be located on a storage system (e.g., storage system 104 shown in FIG. 1) and associated with access requests to a particular storage system memory resource (e.g., memory resource 108-1 to 108-N) a.

When data stored on one of a number of devices (e.g., storage system 232 of the computing system 210) is to be modified, the computing system 210 may first modify the cached version of the page in the page cache component 223 and mark the page as a "dirty" page. At a later point, the new content of the "dirty" page can be copied from the page cache into the driver component 230 to reduce a number of write operations required on the storage device 232 in the event the same page is updated twice in a short period of time.

While the commands are buffered at the page cache component 224, the buffered commands may be aggregated to form an individual command having a larger size (e.g., a sub-block level to a block level) to match the platform memory management model defined by the memory management unit (MMU), which is a hardware component that performs translation between virtual memory addresses and physical memory addresses.

The block layer 228 may store instructions executable by a processing resource (e.g., a processing resource associated with a host) and/or may be provisioned with hardware resources on which the instructions may ultimately be executed to organize and schedule commands routed from the page cache component 224 and further route to the storage system 232 (e.g., via the driver component 230). The block layer 228 may provide, to the storage system 232, buffered access to eventually reorder, reprioritize, and/or merge the routed commands.

The driver component 230 may include instructions executable by a processing resource (e.g., a processing resource associated with a host) and/or may be provisioned with hardware resources on which the instructions may ultimately be executed to provide driver support for various components associated with the computing system 210. For example, the driver component 230 may be configured to execute instructions to load and/or update drivers associated with a host, a memory system, and/or other peripheral devices (not shown) that may be associated with the computing system 200. The commands routed from the block layer 228 may be routed to, via the driver component 230, the storage system 232 including, for example, a controller and a storage device. The byte-level commands aggregated to a block level command and received at the storage system 232 may be executed by the controller on the storage device (e.g., controller 106 shown in FIG. 1).

In some approaches, the portion of the computing system 232 may lack a hybrid interface that can provide an I/O access path supporting both block level storage I/O access requests and sub-block level storage I/O access requests; thereby, lacking a sub-block level accessibility. Therefore, a plurality of byte-level commands (e.g., a plurality of sub-block sized data requests) may be required to be aggregated, at the page cache component 224, to a block level command (e.g., a block sized data request) to be transferred via an I/O access path lacking the sub-block level accessibility. In contrast, in a number of embodiments, a plurality of sub-block sized data requests is not required to be routed through a page cache component 224 as corresponding sub-block level storage I/O access requests can be transferred through the I/O access path of the hybrid interface. Accordingly, in some embodiments of the present disclosure, a portion of the storage system 104 may be allocated, without having a separate component such as the page cache component 224, as a page cache for providing functions that would have been provided by the page cache component 224.

Figure 3:
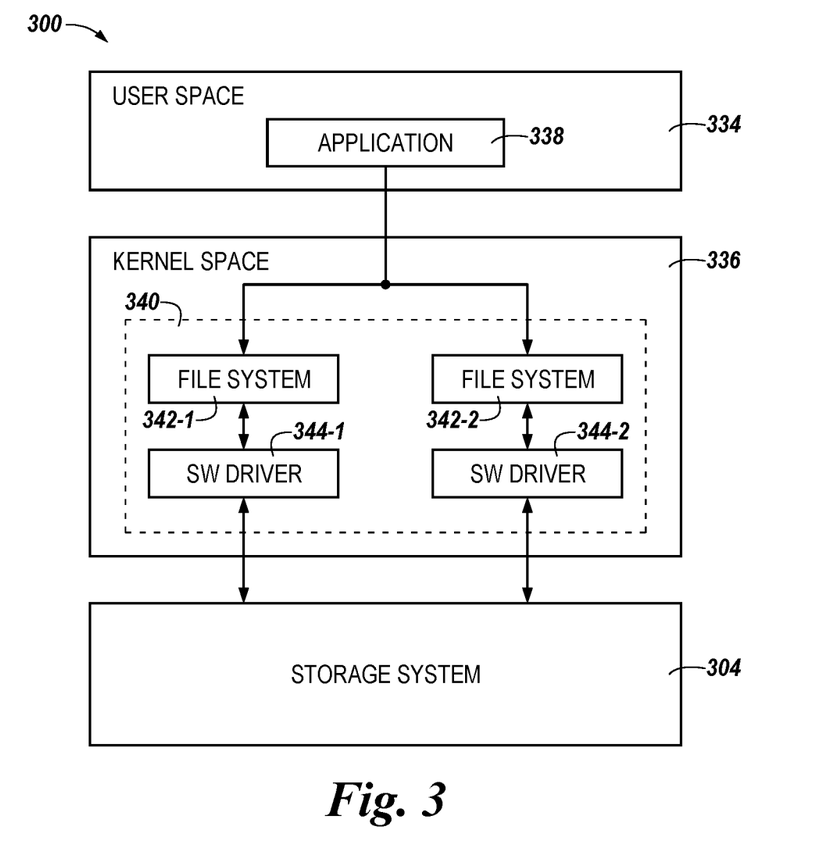
FIG. 3 illustrates a system/application level block diagram representing a portion of a computing system in accordance with a number of embodiments of the present disclosure.

FIG. 3 illustrates a system/application level block diagram representing a portion of a computing system 300 according to a number of embodiments of the present disclosure. The portion of the computing system 300 and the storage system 304 may be analogous to at least a portion of the computing system 100 and the storage system 104, respectively, as described in connection with FIG. 1. Further, a hybrid interface 340 may be analogous to the hybrid interface having the I/O access path 173, as described in connection with FIG. 1.

The portion of the computing system 300 may include a software stack, such as a user space 334 (e.g., "userland) and a kernel 336 (e.g., a system space), responsible for operation of a computing system, and a hardware portion including a storage system 304. As used herein, a "system space" or "kernel space" is a memory location associated with the portion of the computing system 300 in which instructions are stored that may be executed by hardware processors associated with a computing system 300 to control the computing system. In contrast, as used herein, a "user space" is a memory location associated with the portion of the computing system 300 in which instructions corresponding to applications 338 executed by a computing system are stored. The instructions corresponding to the applications 338 may be executed by hardware processors such as the processing resource 103 as described in connection with FIG. 1 to perform a group of coordinated functions, tasks, or activities for the benefit of a user.

In some embodiments, the user space 334 and the system space 336 may be a portion of an operating system. For example, the operating system of the user space 334 and the system space 336 may represent an operating system of a Android® user and a Linux® kernel associated therewith, respectively. In such embodiments, a portion of the computing system 300 may be considered a "software storage stack" (e.g., a portion of the computing system 300 may represent a software-based kernel implementation of an operating system).

The file system 342 may be included in the hybrid interface 430. The file system 342 can have a first portion 342-1 and a second portion 342-2 each coupled to a respective driver (e.g., drivers 344-1 and 344-2). The portions 342-1 and 342-2 of the file system 342 may be virtual file systems and include instructions that may be executed to access local and/or network storage devices such as the storage system 304. The instructions included in the virtual file system may specify one of the portions 342-1 and 342-2 of the file system 340 to be utilized for communicating data and/or other instructions to and/or from the storage system 304. The driver 344-1 and 344-2 may be virtual (e.g., software) drivers to interface with various hardware components (e.g., processors, memory devices, peripheral devices, etc.) associated with a computing system (e.g., computing system 100).

In a number of embodiments, the file system 342 may be configured to manage both block level storage I/O access requests and sub-block level storage I/O access requests. Each portion of the file system 342 may be utilized to manage different types of storage I/O access requests. For example, the first portion can be configured to manage the block level storage I/O access requests, while the second portion can be configured to manage the sub-block level storage I/O access requests.

Accordingly, sub-block sized data requests corresponding to the sub-block level storage I/O access requests can be serviced without having been aggregated to the block level sized data request. As an example, a processing resource (e.g., processing resource 103 as described in connection with FIG. 1) may be configured to directly access (e.g., a memory resource having the sub-block level accessibility of) the storage system 304 via the hybrid interface 340 responsive to receipt of a sub-block sized data request, and execute a set of instructions associated with the sub-block sized data request directly from the storage system 304. The set of instructions may cause the processing resource to launch a mobile application.

In various embodiments, the file system 342 of the hybrid interface 340 may include a direct access (DAX) capable file system portion. A DAX capable file system refers to a file system capable of performing read and/or write operations directly to the storage system 304 (e.g., from the user space 334). Stated differently, data, commands, instructions, and/or requests may be routed, transferred, and/or copied directly to and from the storage system 304 without routing, transferring, and/or copying through a main memory (e.g., main memory 109). As such, in some embodiments, the storage system 304 can be directly mapped to the user space 334 for direct access to storage system 304 (e.g., to perform read/writes).

In some embodiments, requests, data, and/or instructions may be communicated to and/or from the storage system 304 via a shared bus. For example, regardless of whether the requests, data, and/or instructions correspond to block level or sub-block level, the requests, data, and/or instructions may be communicated from the storage system 304 via the same shared bus. However, embodiments are not so limited. For example, block level and sub-block level requests, data, and/or instructions may be communicated to and/or from the storage system 304 via different respective buses. For example, a sub-block level storage I/O access request may be communicated via a bus that is different than a bus utilized for communicating a block level storage I/O access.

In some embodiments, sub-block sized database files such as data associated with the database management system (DBMS), file metadata, and/or metadata of the file system 340 may be directly accessed, via the second portion 342-2 of the file system 342, by a processing resource (e.g., processing resource 103). For example, multiple sub-block sized database files such as the data associated with the DBMS, file metadata, and/or metadata of the file system 340 may be concurrently accessed by processes being concurrently executed by the processing resource. The DBMS, such as NoSQL, SQLite, a cloud-based DBMS, or other suitable DBMS, may be database system processes and/or applications executed in the user space 334. The DBMS may allow an end user to create, read, update, and/or delete data in a database associated with portion of the computing system 300.

Figure 4:
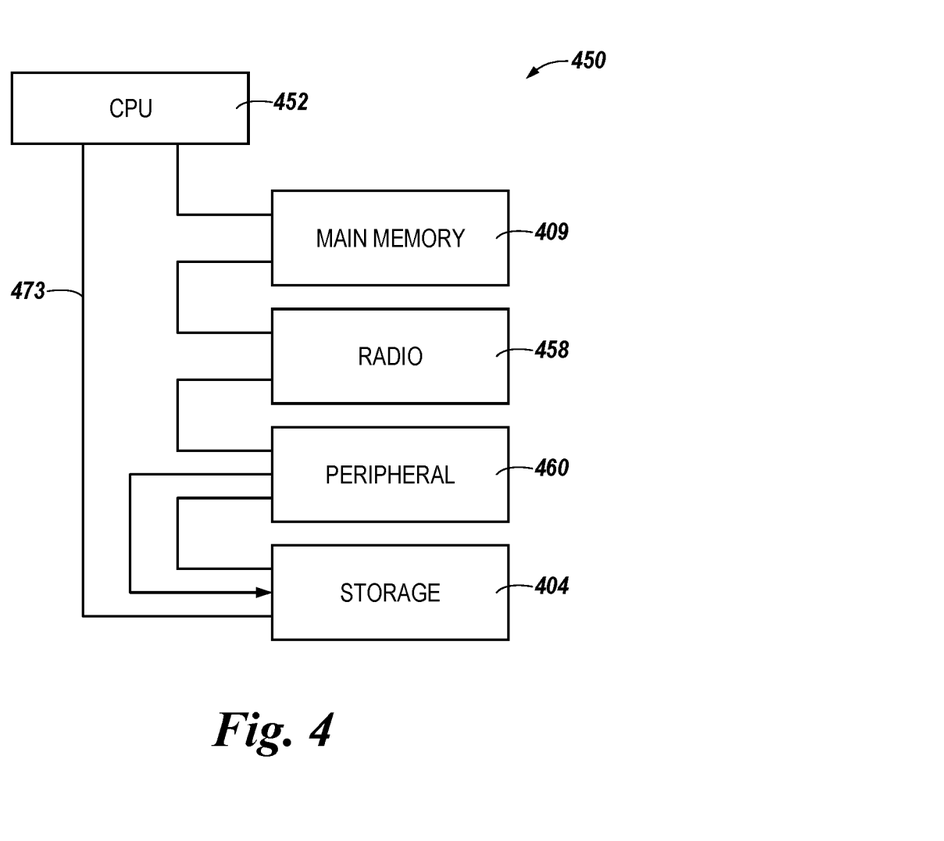
FIG. 4 illustrates a schematic diagram of a portion of a computing system including a central processing unit (CPU) in accordance with a number of embodiments of the present disclosure.

FIG. 4 illustrates a schematic diagram of a portion of a computing system 450 including a central processing unit (CPU) 452 in accordance with a number of embodiments of the present disclosure. A main memory 409 and a storage system 404 may be analogous to the main memory 109 and the storage system 104 as described in connection with FIG. 1.

As illustrated in FIG. 4, the CPU 452 is coupled to other components (e.g., main memory 409, radio 458, peripheral component 460, and/or storage system 404) of the portion of the computing system 450 via an I/O access path 471. The I/O access path 471 can be provided by a hybrid interface (e.g., hybrid interface 340) via which the host 102 can be coupled to the storage system 404, as described herein. The I/O access path can support both block level storage I/O access requests and sub-block level storage I/O access requests, which may be managed by the file system such that the sub-block level storage access requests can be serviced without having been aggregated for transfer to/from the storage system. The I/O access path 471 may include a system bus that connects major components of a computing system, combining the functions of a data bus to communicate data, an address bus to determine a destination of the data, and a control bus to determine operations associated with the data.

The radio component 458 may be a transceiver of the portion of the computing system 450. As an example, a transceiver may be a device including both a transmitter and a receiver of the portion of the computing system 450. The portion of the computing system 450 may utilize the radio component 458 to wirelessly communicate with other devices.

The peripheral component 460 (e.g., peripheral I/O device) may include instructions executable to put information into and get information out of a computing system (e.g., the portion of the computing system 450). As an example, the peripheral component 460 may include various components of the computing system 450 such as an input device (e.g., mouse and/or keyboard), an output device (e.g., monitor and/or printer), and/or storage device (e.g., hard disk drive (HDD) and/or solid-state drive (SDD)). Further, other computing systems such as a digital watch, a smartphone, and/or a tablet computer may also include particular interfaces allowing those devices to be used as peripheral devices. A peripheral component 460 may also be an integrated peripheral device that is housed within a primary container of the computing systems. As an example, a digital camera of a mobile device may be an integrated peripheral device in contrast to keyboard, mouse, and/or printer that are external peripheral device, for example, of a laptop and/or a desktop.

The peripheral component 460 (e.g., integrated peripheral device) may further include an image signal processor (ISP) that can be utilized to perform various operations including color correction operations such as defect correction, demosaic (color interpolation), white balance, color adjustment, gamma adjustment for lightness and/or contrast enhancement, color conversion, and/or down-sampling. The peripheral component 460 that includes an image signal processor may include a digital camera of a computing device (e.g., digital camera of a mobile device).

The main memory 409 may be volatile memory such as RAM, DRAM, SRAM etc. that may be used to store one or more pages of data associated with operation of the portion of the computing system 450. Embodiments are not limited to volatile memory; however, and the main memory may include non-volatile memory in addition to volatile memory or in lieu thereof.

In some approaches, a main memory may act as an intermediary device through which requests, data, and/or instructions are transferred. As an example, the data and/or the set of instructions retrieved from a storage system can be copied to the main memory such that a processing resource such as the CPU 452 can access the data and/or the set of instructions from the main memory. As another example, sub-block sized data requests may be buffered, prior to being executed, at the main memory such that the sub-block sized data requests can be aggregated to a block sized data request. In these approaches, transfer of requests, data, and/or instructions may incur additional operations that may put the main memory under pressure. Particularly, resources of a main memory of a mobile system may be relatively scarce and the pressure put to the main memory may incur serious latencies associated with operating the mobile system.

Accordingly, in a number of embodiments, the main memory 409 may be offloaded of burdens of performing the additional operations by transferring requests, data, and/or instructions directly among devices of the computing system (e.g., mobile system) and without transferring the data through the main memory 409, as described further below.

For example, the CPU 452 may execute a set of instructions corresponding to a sub-block sized data requests directly from (e.g., a memory resource having the sub-block level accessibility of) the storage system 404. Stated alternatively, the CPU 452 may be configured to execute the set of instructions from the memory resource having the sub-block level accessibility (e.g., of the storage system 404) without first transferring them to the main memory as opposed to those approaches, in which a set of instructions were copied to a main memory and a CPU accessed the set of instructions from the main memory.

For example, a direct memory access (DMA) transfer may be performed without transferring data associated with the DMA through the main memory. As used herein, a DMA transfer refers to a data transfer between a source device and a destination device independently of a CPU (e.g., CPU 452). By performing the DMA transfer, rather than operations directed by the CPU, the CPU may be offloaded from burdens of directing operations whose entire process needs not be provisioned by the CPU. In some approaches, the DMA transfer has been associated with utilizing a main memory such that data to be transferred between the source device and the destination device (e.g., one of the components 458, 460, and/or 462) has been transferred through the main memory prior to being received at the destination device.

In contrast, the hybrid interface may be configured to allow data from the peripheral component 460 (e.g., peripheral I/O device) to be stored directly to a memory resource of the storage system without first being transferred from the peripheral component 460 to the main memory 409. Stated differently, a processor (e.g., ISP) of the peripheral component 460 (e.g., to which the storage system 404 is coupled via a bus of the I/O access path 471) may be configured to directly access the storage system 404 via the hybrid interface such that, for example, a memory resource having the sub-block level accessibility may be directly accessed by the processor.

Figure 5:
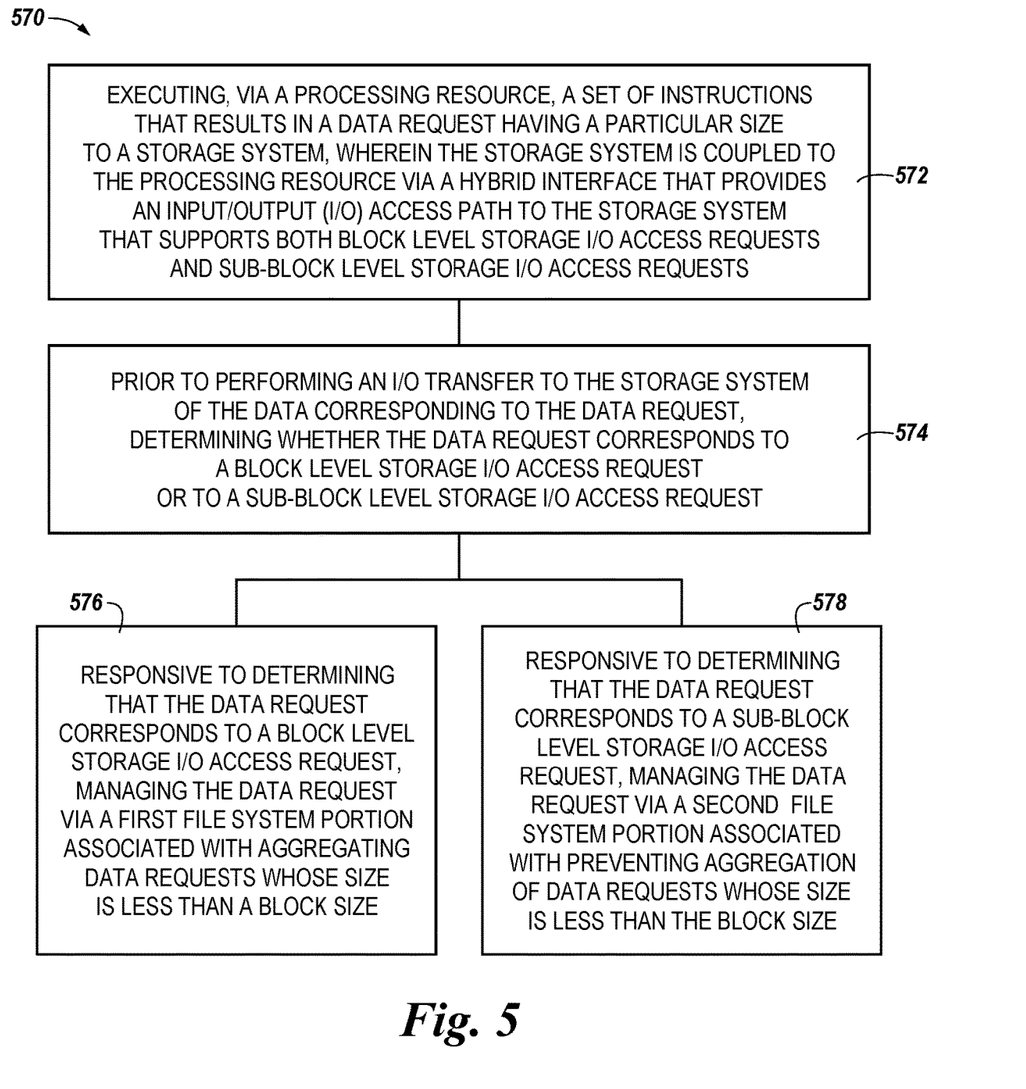
FIG. 5 illustrates an example flow diagram illustrating an example of a method for operating a computing system in accordance with a number of embodiments of the present disclosure.

FIG. 5 illustrates an example flow diagram illustrating an example of a method 570 for operating a computing system (e.g., a mobile system) in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 572, the method 570 may include executing, via a processing resource, a set of instructions that results in a data request having a particular size to a storage system. The storage system may be analogous to the storage system 104, 304, and/or 404 described in connection with FIGS. 1, 3, and/or 4, respectively. The storage system may be coupled to the processing resource (e.g., processing resource 103 as described in connection with FIG. 1) via a hybrid interface that can provide an input/output (I/O) access path to the storage system. The I/O access path can support both block level storage I/O access requests and sub-block level storage I/O access requests, as described herein.

At block 574, the method 570 may include, prior to performing an I/O transfer to the storage system of the data corresponding to the data request, determining whether the data request corresponds to a block level storage I/O access request or to a sub-block level storage I/O access request. At block 576, the method 570 may include, responsive to determining that the data request corresponds to a block level storage I/O access request, managing the data request via a first file system portion associated with aggregating data requests whose size is less than a block size. At block 578, the method 570 may include, responsive to determining that the data request corresponds to a sub-block level storage I/O access request, managing the data request via a second file system portion associated with preventing aggregation of data requests whose size is less than the block size. The first file system portion and the second file system portion may be analogous to the first portion 342-1 and the second portion 342-2 of the file system 342, respectively, as described in connection with FIG. 3. In some embodiments, data managed by the second file system portion can include a database management system (DBMS), file metadata, and/or metadata of a file system.

In some embodiments, the method 570 may further include, prior to executing the set of instructions, directly accessing, by the processing resource, to a memory resource of the storage system that stores the set of instructions. The method 570 may further include executing the set of instructions directly from the memory resource without transferring the stored set of instructions to a main memory of the mobile system.

In some embodiments, the storage system may include a memory resource storing multiple sub-block sized database files. In this example, the method 570 may further include providing concurrent access to the multiple sub-block sized database files by processes being concurrently executed by the processing resource.

In some embodiments, the mobile system may include a peripheral I/O device (e.g., peripheral component 460) and a main memory. In this example, the method 570 may further include performing a DMA by allowing sub-block sized data from the peripheral (I/O) device to be stored, without first being transferred from the peripheral I/O device to the main memory, directly to a memory resource of the storage system that has a sub-block level accessibility. As described in connection with FIG. 4, a DMA transfer refers to a data transfer between a source device and a destination device independently of a processing resource such as a CPU.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing system, comprising:
   a storage system;
   a main memory; and
   a processing resource coupled to the main memory and the storage system via a hybrid interface;
   wherein the main memory is an intermediary device through which requests, data, and instructions are transferred between the processing resource and the storage system; and
   wherein the hybrid interface is configured to, in response to receipt of sub-block sized data requests:
      provide an input/output (I/O) access path via a shared bus to the storage system that supports both:
         block level storage I/O access requests by aggregating the sub-block data requests at the main memory to allow the processing resource to access the storage system via the shared bus based on the aggregated sub-block data requests; and
         sub-block level storage I/O access requests by preventing the sub-block data requests from being aggregated, to a block-sized data request, at the main memory to allow the processing resource to directly access the storage system via the shared bus; and
   wherein block level storage I/O requests correspond to storage I/O requests having a size greater than a host cache line size, and wherein sub-block level storage I/O requests correspond to storage I/O requests having a size not greater than the host cache line size.

2. The computing system of claim 1, wherein the hybrid interface comprises a file system including:
   a first portion configured to manage the block level storage I/O access requests; and
   a second portion configured to manage the sub-block level storage I/O access requests, wherein the second portion is a direct access capable file system portion.

3. The computing system of claim 1, wherein the storage system is a hybrid memory storage system comprising:
   a first type of non-volatile memory resource; and
   a second type of non-volatile memory resource;
   wherein only one of the first type and the second type of non-volatile memory resource supports sub-block level storage I/O access requests.

4. The computing system of claim 1, wherein the sub-block sized data requests are generated in association with executing an application.

5. The computing system of claim 1, wherein the hybrid interface is configured to, responsive to receiving a plurality of sub-block sized data requests generated in association with executing a number of applications, generate a respective plurality of separate sub-block sized storage I/O access requests such that the respective sub-block sized data requests are serviced without having been aggregated for transfer to/from the storage system.

6. The computing system of claim 1, wherein the storage system comprises a memory resource storing multiple sub-block sized database files, and wherein the hybrid interface is configured to provide concurrent access to the multiple sub-block sized database files by processes being concurrently executed by the processing resource.

7. The computing system of claim 1, wherein the computing system is a mobile system, and wherein:
   the storage system is configured to store sets of instructions executable by the processing resource in association initiating respective applications; and wherein the hybrid interface is configured to, responsive to a request to initiate a particular application, provide direct access by the processing resource to the stored set of instructions corresponding thereto without transferring the stored set of instructions to the main memory of the mobile system.

8. The computing system of claim 1, further comprising:
a peripheral I/O device;
wherein the peripheral I/O device is coupled to the processing resource and to the storage system via a bus; and
wherein the hybrid interface is configured to allow data from the peripheral I/O device to be stored directly to a memory resource of the storage system without first being transferred from the peripheral I/O device to the main memory.

9. A computing system, comprising:
a storage system comprising:
a first non-volatile memory resource having a block level accessibility; and
a second non-volatile memory resource having a sub-block level accessibility;
a hybrid interface configured to manage both block level and sub-block level storage input/output (I/O) access requests;
a main memory; and
a processing resource coupled to the storage system via the hybrid interface and to the main memory, wherein the main memory is an intermediary device through which requests, data, and instructions are transferred between the processing resource and the storage system;
a main memory coupled to the processing resource and the storage system via a bus; and
wherein the processing resource is configured to, responsive to a receipt of a sub-block sized data request:
generate a sub-block sized storage I/O access request by preventing the sub-block sized data request from being aggregated, at the main memory, to a block sized data request;
directly access, via the bus to the storage system, the second non-volatile memory resource via the hybrid interface based on the generated sub-block sized storage I/O access request; and
execute a set of instructions associated with the sub-block sized data request directly from the second non-volatile memory resource; and
wherein block level storage I/O requests correspond to storage I/O requests having a size greater than a host cache line size, and wherein sub-block level storage I/O requests correspond to storage I/O requests having a size not greater than the host cache line size.

10. The computing system of claim 9, wherein the processing resource is a central processing unit (CPU), and wherein the processing resource is configured to execute the set of instructions from the second non-volatile memory resource without first transferring them to the main memory.

11. The computing system of claim 9, wherein the processing resource is a processor of a peripheral I/O device to which the storage system is coupled via the bus.

12. The computing system of claim 9, wherein the computing system is a mobile system, and wherein the set of instructions causes the CPU to launch a mobile application.

13. The computing system of claim 9, wherein the first non-volatile memory resource having the block level accessibility is a NAND flash memory resource.

14. The computing system of claim 9, wherein the second non-volatile memory resource having the byte-level accessibility includes an emerging non-volatile memory resource.

15. The computing system of claim 9, wherein the first and the second non-volatile memory resources are accessed via a shared bus.

16. The computing system of claim 9, wherein the first non-volatile memory resource is accessed via a first data bus and the second non-volatile memory resource is accessed via a second data bus that is different from the first data bus.

17. A method for operating a computing system, comprising:
executing, via a processing resource coupled to a main memory that is an intermediary device through which requests, data, and instructions are transferred between the processing resource and a memory resource, a set of instructions directly from the memory resource that stores the set of instructions without transferring the stored set of instructions to a main memory, which results in a data request having a particular size to a storage system;
wherein the storage system is coupled to the processing resource via a hybrid interface that provides an input/output (I/O) access path to the storage system that supports both block level storage I/O access requests and sub-block level storage I/O access requests;
prior to performing an I/O transfer to the storage system of the data corresponding to the data request, determining whether the data request corresponds to a block level storage I/O access request or to a sub-block level storage I/O access request;
responsive to determining that the data request corresponds to a block level storage I/O access request, providing access from the main memory to the storage system via a first data bus by managing the data request via a first file system portion associated with aggregating data requests whose size is less than a block size; and
responsive to determining that the data request corresponds to a sub-block level storage I/O access request, providing access from the processing resource to the storage system via a second data bus by managing the data request via a second file system portion associated with preventing aggregation, at the main memory, of data requests whose size is less than the block size;
wherein block level storage I/O requests correspond to storage I/O requests having a size greater than a host cache line size, and wherein sub-block level storage I/O requests correspond to storage I/O requests having a size not greater than the host cache line size.

18. The method of claim 17, wherein the data managed by the second file system portion includes data associated with a database management system (DBMS).

19. The method of claim 17, wherein the computing system is a mobile system.

20. The method of claim 17, wherein:
the storage system comprises a memory resource storing multiple sub-block sized database files; and
the method further comprises providing concurrent access to the multiple sub-block sized database files by processes being concurrently executed by the processing resource.

21. The method of claim 17, wherein:
the computing system is a mobile system that further comprises a peripheral input/output (I/O) device and the main memory; and the method further comprises performing a direct memory access (DMA) by allowing sub-block sized data from the peripheral (I/O) device to be stored, without first being transferred from the peripheral I/O device to the main memory, directly to a memory resource of the storage system that has a sub-block level accessibility.

* * * * *